(12) United States Patent
Liu et al.

(10) Patent No.: US 9,781,038 B2
(45) Date of Patent: Oct. 3, 2017

(54) PACKET ROUTING AND FORWARDING IN INFORMATION CENTRIC NETWORKING

(71) Applicant: FUJITSU LIMITED, Kawasaki-shi, Kanagawa (JP)

(72) Inventors: Lei Liu, Sunnyvale, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 14/868,201

(22) Filed: Sep. 28, 2015

(65) Prior Publication Data

US 2017/0093714 A1   Mar. 30, 2017

(51) Int. Cl.
| | |
|---|---|
| H04L 12/741 | (2013.01) |
| H04L 12/747 | (2013.01) |
| H04L 29/06 | (2006.01) |
| H04L 29/08 | (2006.01) |

(52) U.S. Cl.
CPC .......... *H04L 45/745* (2013.01); *H04L 45/742* (2013.01); *H04L 67/2852* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2004/0083273 A1* | 4/2004 | Madison | ................. | H04L 29/06 709/217 |
| 2010/0195655 A1* | 8/2010 | Jacobson | .............. | H04L 45/748 370/392 |
| 2012/0317307 A1* | 12/2012 | Ravindran | .......... | H04L 12/6418 709/238 |

OTHER PUBLICATIONS

L. Zhang, et al., "Named Data Networking," ACM Computer Communication Review, vol. 44, No. 3, pp. 66-73, Jul. 2014.
A K M Mahmudul Hogue, et al., "NLSR: Named-data Link State Routing Protocol," Proceedings of the 3rd ACM SIGCOMM Workshop on Information-Centric Networking (ICN 2013), pp. 15-20, NY, USA, Aug. 2013.

* cited by examiner

*Primary Examiner* — Kodzovi Acolatse
(74) *Attorney, Agent, or Firm* — Maschoff Brennan (57) ABSTRACT

A method may include receiving a content packet at an incoming interface of a network device; determining whether the content packet matches an identifier of the content packet in an entry in a pending interest table (PIT); discarding the content packet when the content packet does not match the identifier of the content packet in the entry in the PIT; removing a matching entry from the PIT when the content packet matches the identifier of the content packet in the matching entry in the PIT; caching the content packet in a content store (CS); adding the matching entry to a pending interest removal table (PIRT); and sending a message to one or more network devices that indicates that the content packet is cached on the network device.

17 Claims, 5 Drawing Sheets

PACKET ROUTING AND FORWARDING IN INFORMATION CENTRIC NETWORKING

FIELD

The embodiments discussed herein are related to packet routing and forwarding in information centric networking (ICN) networks.

BACKGROUND

The Internet is currently based on an Internet Protocol (IP) structure, with a frame of reference of where content is located, for example, at a given IP address. In information centric networking (ICN) networks, the frame of reference is based on what content is requested, rather than where the content is located.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving a content packet at an interface of a network device; determining whether the content packet matches an identifier of the content packet in an entry in a pending interest table (PIT); discarding the content packet when the content packet does not match the identifier of the content packet in the entry in the PIT; removing a matching entry from the PIT when the content packet matches the identifier of the content packet in the matching entry in the PIT; caching the content packet in a content store (CS); adding the matching entry to a pending interest removal table (PIRT); and sending a message to one or more network devices that indicates that the content packet is cached on the network device.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to the routing and forwarding of interest packets, pending interest tables (PITs), and pending interest removal tables (PIRTs) in an information centric networking (ICN) network. In ICN networks, an interest packet may request content. In the present disclosure, a packet requesting content may be referred to as an interest packet, and a packet providing content that is requested by an interest packet may be referred to as a content packet.

In some embodiments in the present disclosure, a PIRT may be introduced into an ICN router. The PIRT may be used to manage removed entries from the PIT. ICN routers may use the PIRT to identify content that may be cached on other ICN routers, which may be closer than a remote data storage. By identifying other (e.g., neighboring) ICN routers with cached content, an ICN router may be more efficient in returning content to a requesting device as compared to conventional ICN techniques. The techniques described herein may provide more efficient content routing, using less network bandwidth and time to provide content to a content requestor.

Embodiments of the present disclosure are explained with reference to the accompanying drawings.

Figure 1:
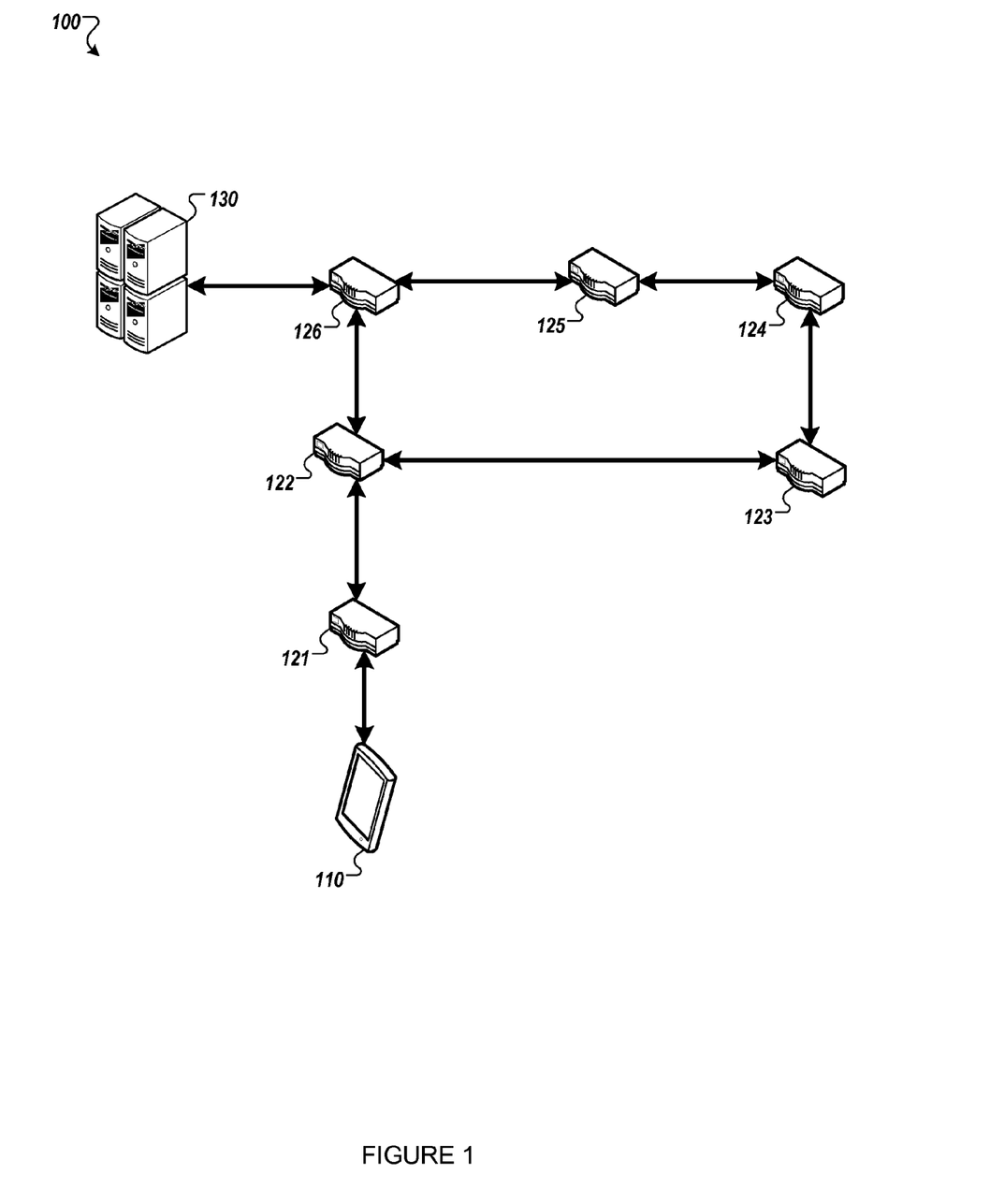
FIG. 1 is a diagram representing an example information centric networking (ICN) network related to routing and forwarding packets.

FIG. 1 is a diagram representing an example network 100 operating as an ICN network, according to at least one embodiment of the present disclosure. The network 100 may include an end user device 110, one or more network devices 121, 122, 123, 124, 125 and 126, and a content host 130. The network 100 may have packets, such as interest packets and content packets, routed through the network 100 according to a set of rules.

As illustrated in FIG. 1, arrowed lines may indicate a connection over which data may be communicated, including general traffic (e.g. interest packets and content packets) for the network 100 and management traffic (e.g. connection status notifications) for the network 100.

The end user device 110 may include any device, system, component, or collection of components configured to request content from a remote device. The end user device 110 may be implemented as a computer (such as a desktop, laptop, server, etc.), as a mobile device (such as a cellular telephone, personal digital assistant (PDA), tablet, etc.), or as any other device connected to a network (such as a network-enabled thermostat, refrigerator, or other appliance). The end user device 110 may include a processor, a memory, a network interface, and a storage media. By way of example, during operation in the network 100, the end user device 110 may send an interest packet to the network device 121. Because the network 100 is operating as an ICN network, the interest packet may not indicate where the desired content is located, but instead may name the content desired by the end user device 110.

The network devices 121, 122, 123, 124, 125 and 126 may include any device, system, component, or collection of components configured to receive, handle, and/or process packets within the network 100. The network devices 121, 122, 123, 124, 125 and 126 may each be implemented as a router, a gateway, a switch, or any other network element. In some embodiments, the network devices 121, 122, 123, 124, 125 and 126 may each include a processor, a memory, a network interface, and a storage media. The network devices 121, 122, 123, 124, 125 and 126 may each also include one or more interfaces over which the network devices 121, 122, 123, 124, 125 and 126 communicate. An interface may include a physical and/or logical entrance or exit point for communication with a network device. For example, the network device 121 may have a first interface that connects the network device 121 to the end user device 110 and a second interface that connects the network device 121 to the network device 122.

In some embodiments, the network devices 121, 122, 123, 124, 125 and 126 may each include a content store (CS), a pending interest table (PIT), a pending interest removal (PIRT) table, and a forwarding information base (FIB). The CS, PIT, PIRT, and FIB may include physical or logical storage components or locations within the memory and/or the storage media of the network devices 121, 122, 123, 124, 125 and 126. An example of an operation/structure/information for each of a content store, a PIT, a PIRT, and a FIB are now explained in general with respect to any network device.

In some embodiments, a content store may operate as a storage location for content which has been requested by another device in the network 100. By implementing one or more network devices in the network 100 with content stores, content that is frequently requested may be located in the content stores of multiple network devices and may be provided to devices requesting the content more quickly and/or efficiently.

In some embodiments, the PIT may serve as a status indicator of what interest packets have been received by a network device for which the network device is still awaiting a content packet. For example, the PIT may have table entries associating identifiers of requested content with interfaces of the network device that have received interest packets requesting the content. The PIT may be used when a content packet is received by the network device to identify which interfaces have requested that content so the content packet may be sent out from the network device on the interfaces that requested the content, referred to as requesting interfaces.

In some embodiments, the PIRT may serve as a status indicator of what interest packet entries have been removed from the PIT and where content may be cached within the ICN. The PIRT may include any number of entries. Each entry may include information regarding where content may be stored within the ICN. For example, the PIT may have table entries associating requested content with other network devices that have cached the requested content. The PIRT may be used when a content packet is received by the network device to identify which other network devices have cached that content such that the content packet may be requested from those other network device(s). Each entry in the PIRT may include a prefix, an identification of one or more interfaces, and timeout fields. The timeout fields may indicate when the entry is to be removed from the PIRT. In some embodiments, when an entry is removed from the PIT, it is added to the PIRT. Alternatively, the most popular entries (e.g., entries with a number of requesting interfaces above a threshold amount) may be added to the PIRT while less popular entries may not be added to the PIRT. In some embodiments, a policy may specify certain content that is not to be cached on a network device. In such embodiments, entries that are removed from the PIT may not be added to the PIRT if the content associated with the entry is not cached on the network device.

Figure 2:
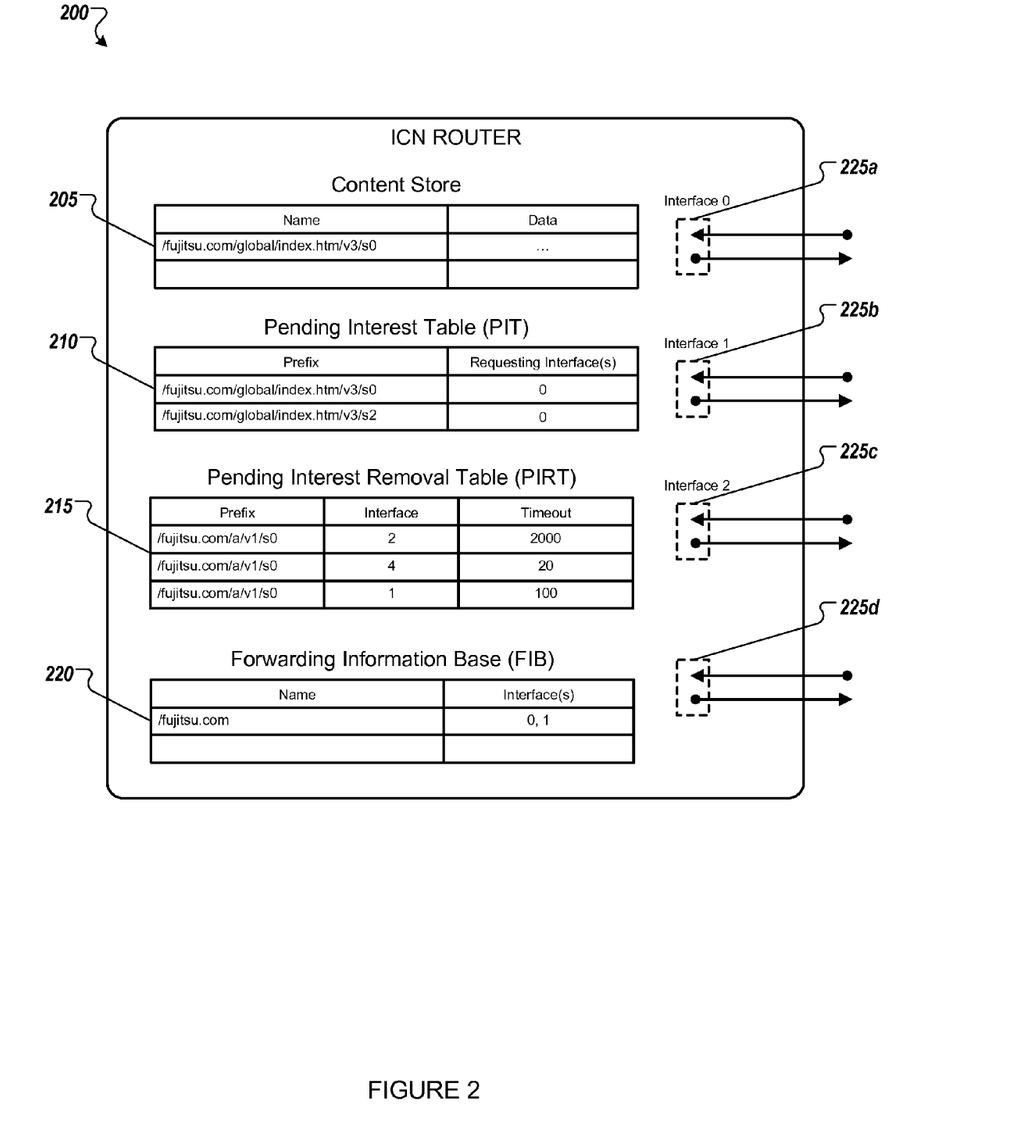
FIG. 2 is an example diagram of various tables within a network device.

In some embodiments, the FIB may include a database, a set of rules, protocols, or the like by which a network device may determine where to forward an interest packet when received by the network device. For example, when an interest packet is received at the network device, the FIB may be utilized to determine which interface or interfaces of the network devices are used to transmit the interest packet to request the content. An example of a CS, a PIT, a PIRT, and a FIB is also illustrated in FIG. 2.

The content host 130 may include any device, system, component, or collection of components configured to store and provide content within the network 100. The content host 130 may include a processor, a memory, a network device, and a storage media. The content host 130 may be connected to any of the one or more of the network devices 121, 122, 123, 124, 125, and 126. When the content host 130 receives an interest packet for content stored on the content host 130, the content host 130 may send a content packet with the content to the device (e.g., end user device 110, network device 121, 122, 123, 124, 125, 126) that sent the interest packet.

By way of example, operation of the network device 121 is now described. The network devices 122, 123, 124, and 125 may operate according to the same principles as described with respect to the network device 121.

For example, when the network device 121 receives an interest packet at an incoming interface (for example, from the end user device 110 or another network device 122), the network device 121 may check if the interest packet is requesting content already stored in the content store of the network device 121. If the content is in the content store of the network device 121, the network device 121 may send the content in a content packet back over the interface through which the interest packet was received. For example, as shown in FIG. 1, an interest packet may be sent from the end user device 110 and received by the network device 121 at an interface. A content packet in response to the received interest packet may be sent to the end user device 110 over the same interface that received the interest packet from the end user device 110.

If the content is not in the content store of the network device 121, the network device 121 may check the PIT of the network device 121 to determine if there is an entry for the interest packet. If there is an entry in the PIT for the interest packet, the network device 121 may update the entry for the interest packet to also include the interface over which the interest packet was received. For a new entry in the PIT, the network device 121 may forward the interest packet according to rules in the FIB. For example, the rules in the FIB may follow a Named Data Link State Routing (NLSR) protocol or other routing protocols used in ICN networks. Forwarding the interest packet may cause the interest packet to be forwarded over one interface or multiple interfaces. Using ICN default rules, a single interest packet may be forwarded for content, and any additional interest packets requesting the same content may update the PIT entry. Also, one interest packet received on an interface may result in one content packet being sent over the same interface. If there is no entry for the interest packet in the PIT, the network device 121 may check the PIRT of the network device 121 to determine if there is an entry for the interest packet in the PIRT. If there is an entry in the PIRT for the interest packet, the network device 121 may forward the interest packet according to instructions for that interest packet in the PIRT. For example, the network device 121 may send the interest packet to a neighboring network device that has the requested content. The network device 121 may receive the requested content from the neighboring network device and may forward the content to the end user device 110 through the interface through which the interest packet came. If there is not a matching entry in the PIRT, the network device 121 may check the FIB for the matching entry. If there is not a matching entry in the FIB, the network device 121 may drop the interest packet or send a negative acknowledgment message ("NACK") toward the end user device 110 through the interface by which the interest packet came. If the FIB includes a matching entry, the network device 121 may forward the interest packet based on the FIB.

As another example, when the network device 121 receives a content packet, the network device 121 may check the PIT to determine whether the network device 121 has an entry for the content in the content packet. If there is no entry for the content in the PIT, the network device 121 may discard the content packet. The PIT of the network device 121 may have no entry for the content when the network device 121 has not received an interest packet requesting the content. If there is an entry in the PIT for the content, the network device 121 may forward the content through an interface of the network device 121 from which the corresponding interest packet was received and may determine that the interest packet for the requested content has been satisfied and remove the entry from the PIT.

When the network device 121 removes the entry for the content from the PIT, the network device 121 may cache the content in the CS. The network device 121 may add the removed entry for the content to the PIRT. The network device 121 may advertise to neighboring network devices (e.g., network device 122) that the content is cached on the network device 121. The advertisement may include a link state advertisement ("LSA"). In some embodiments, the network device 121 sends the advertisement to network devices that are one hop away from the network device 121. Alternatively, the network device 121 may send the advertisement to network devices that are multiple hops away from the network device 121. In some embodiments, the network device 121 may send the advertisement to neighbors that are not on a current incoming or outgoing interface for the content. In other embodiments, in an ICN with a special caching policy that specifies that not all network devices on a routing path may cache the content, the network device 121 may send the advertisement to neighboring network devices on the current incoming or outgoing interface(s). When a neighboring network device receives the advertisement, the neighboring network device may update its PIRT to add an entry that the content is cached on the network device 121. Alternatively, the neighboring network device may update its FIB table by adding a new FIB entry and a corresponding timeout period for the entry.

In another example, when the end user device 110 requests content stored on the content host 130 in the network 100 (and for the sake of the example, not stored on any of the intervening network devices such that the requested content comes from the content host 130), the network device 121 may update the PIT of the network device 121 with the interest packet and may send the interest packet to the network device 122 based on the FIB of the network device 121. The network device 122 may update the PIT of the network device 122 with the interest packet and may send the interest packet to the network device 126 based on the FIB of the network device 122. The network device 126 may update the PIT of the network device 126 with the interest packet and may send the interest packet to the content host 130 based on the FIB of the network device 126.

In some embodiments, based on the interest packet, the content host 130 may select the requested content and generate a content packet that includes the requested content. The content host 130 may send the content packet to the network device 126. The network device 126 may store the content of the content packet in the content store of the network device 126, may remove the PIT entry, may store the removed entry in a PIRT, may advertise that the content of the content packet has been cached on the network device 126, and may send the content packet to the network device 122. The network device 122 may store the content of the content packet in the content store of the network device 123, may remove the PIT entry, may store the removed entry in a PIRT, may advertise that the content of the content packet has been cached on the network device 122, and may send the content packet to the network device 121. The network device 121 may store the content of the content packet in the content store of the network device 121, may remove the PIT entry, may store the removed entry in a PIRT, may advertise that the content of the content packet has been cached on the network device 121, and may send the content packet to the end user device 110. The above-description may describe the general operation of the network devices 121, 122, 123, 124, 125 and 126.

The content host 130 may send a content packet responsive to the interest packets through the requesting interface, e.g. to the network device 126. The network device 126 may store the content in the content store of the network device 126, may remove the PIT entry, may store the entry in a PIRT, may advertise that the content of the content packet has been cached on the network device 126, and may send the content in a content packet to the network device 122. The network device 126 may have PIT entries for the content to be sent to both the network device 122 (because of the initial user request) and to the network device 125 (because of an interest packet).

In some embodiments, one of the network devices 123 may receive an interest packet for the content at an incoming interface (for example, from another end user device (not shown) or from another network device). The network device 123 may check if the interest packet is requesting content already stored in the content store of the network device 123. In this example, the content is not cached in the network device 123. The network device 123 may check its PIT and likewise may not find a matching entry in this example. The network device 123 may check its PIRT and, in this example, may find a matching entry that specifies that network device 122 has cached the content. The network device 123 may send an interest packet to the network device 122 for the content. When the network device 123 receives the content from the network device 122, the network device 123 may send the requested content back over the interface through which the interest packet was received and to the original requester (e.g., the other end user device (not shown) or the other network device).

In some embodiments, an outgoing interface and an incoming interface may be the same physical interface. For example, in some embodiments a network device may have one physical connection to the network 100 that may include multiple logical interfaces. In some embodiments, an interest packet may be received at a network device and, based on the PIRT and/or the FIB of the network device, may be routed out of the same interface.

The process by which the PIRT entries are added in accordance with some embodiments of the present disclosure may also be described with reference to FIG. 3. The process by which the PIRT entries may be used to identify content in accordance with some embodiments of the present disclosure may also be described with reference to FIG. 4.

Modifications, additions, or omissions may be made to FIG. 1 without departing from the scope of the present disclosure. For example, the network 100 may include more or fewer elements than those illustrated and described in the present disclosure. For example, the network 100 may include many more network devices, content hosts, and end user devices arranged in any topology. The small number of network nodes and simple topology illustrated in FIG. 1 are for ease in understanding the present disclosure.

FIG. 2 is an example diagram of various tables within a network device 200, according to at least one embodiment of the present disclosure. The network device 200 may be the same or similar to the network devices 121, 122, 123, 124, 125 and 126 of FIG. 1 or the network device 500 of FIG. 5. The network device 200 may include a content store 205, a PIT 210, a PIRT 215, a FIB 220, and interfaces 225a (Interface 0), 225b (Interface 1), and 225c (Interface 2). In some embodiments, each of the content store 205, the PIT 210, the PIRT 215, the FIB 220, and the interfaces 225a, 225b, and 225c may be implemented as described with respect to FIG. 1.

For example, when an interest packet is received at the network device 200 at the interface 225a, the network device 200 may determine if the content requested in the interest packet is stored in the content store 205. If the content is stored in the content store 205, the network device 200 may send the content to the requester back through the interface 225a. If the content is not in the content store 205, the network device 200 may determine if an entry for the content (e.g., an identifier of the content) requested in the interest packet is stored in the PIT 210. When the PIT 210 includes an entry for the content requested in the interest packet (e.g., an identifier of the content), the network device 200 may update the PIT 210 to include the interest packet. Updating the PIT 210 may include adding the interface 225a to the PIT entry already requesting the content. If an entry for the content requested in the interest packet is not in the PIT 210, the network device 200 may determine if an entry for the content requested in the interest packet is stored in the PIRT 215. When the PIRT 215 includes an entry for the content requested in the interest packet, the network device 200 may forward the interest packet to another network device, as defined in the PIRT 215. The network device 200 may forward the interest packet to another network device over the interface 225a or over another interface (e.g., interface 225b). The network device may receive the content requested in the interest packet from the other network device over the same interface (e.g., interface 225a) over which the interest packet was sent to the other network device. When the PIRT 215 does not include an entry for the content requested in the interest packet, the network device 200 may check the FIB 220 for an entry for the content requested in the interest packet. When the FIB 220 includes an entry for the content requested in the interest packet, the network device 200 may forward the interest packet according to the FIB. When sending an interest packet, the network device 200 may forward the interest packet according to the FIB 220, which, for example, may operate according to the NLSR protocol. When the FIB 220 does not include an entry for the content requested in the interest packet, the network device 200 may drop the interest packet and/or may send a NACK to the requester.

As another example, the network device 200 may determine if the outgoing interface for the interest packet is one of the requesting interfaces. For example, if the interest packet associated with the entry for fujitsu.com/global/index.html/v3/s0 was going out on the interface 225a, the PIT 210 may be updated to remove that interface from the set of requesting interfaces. Such modification of the PIT 210 may remove an entry from the PIT 210, for example, if there are no remaining requesting interfaces for the entry.

Modifications, additions, or omissions may be made to the network device 200 without departing from the scope of the present disclosure. For example, in some embodiments, the network device 200 may include any number of other components that may not be explicitly illustrated or described.

Figure 3:
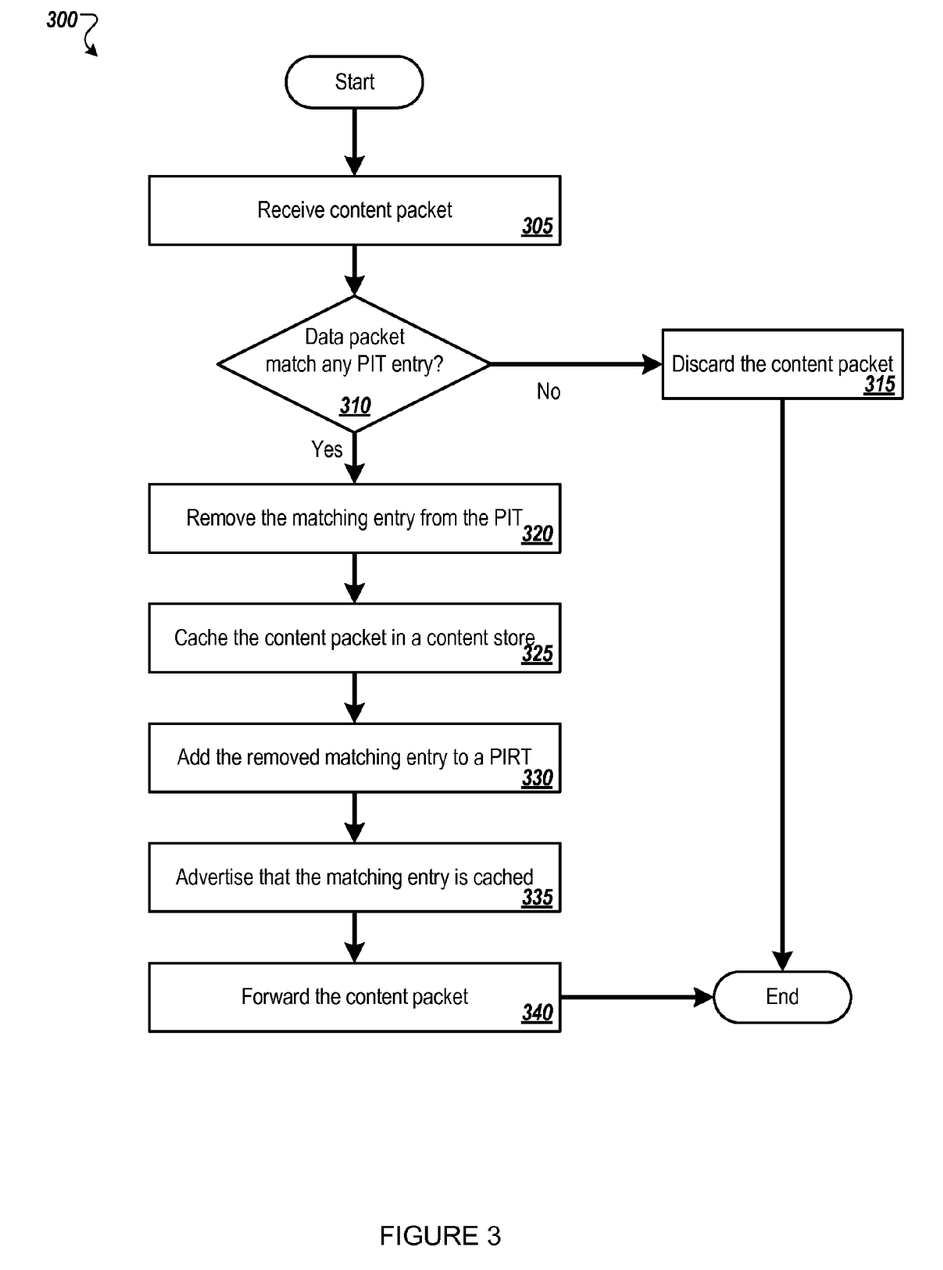
FIG. 3 is a flowchart of an example method of content packet handling in an ICN network.

FIG. 3 is a flowchart of an example method 300 of content packet handling in an ICN network, according to at least one embodiment of the present disclosure. The method 300 may be performed by any suitable system, apparatus, or device. For example, the network 100 of FIG. 1, the network device 200 of FIG. 2, or a computer system 500 of FIG. 5 may perform one or more of the operations associated with the method 300. In these and other embodiments, program instructions stored on a computer readable medium may be executed to perform one or more of the operations of the method 300. For convenience in the discussion that follows, the method 300 is discussed as being performed by a network device.

At block 305, the network device may receive a content packet at an incoming interface (for example, from an end user device or another network device). At block 310, the network device may check a PIT to determine whether the network device has an entry for the content in the content packet, which may include determining whether the content packet matches an identifier of the content packet in an entry in the PIT. If there is no entry for the content in the PIT (e.g., the content packet does not match the identifier of the content packet in the entry in the PIT) ("NO" at block 310), the network device may discard the content packet at block 315. The PIT of the network device may have no entry for the content when the network device has not received an interest packet requesting the content. If there is an entry in the PIT for the content (e.g., the content packet matches the identifier of the content packet in the matching entry in the PIT) ("YES" at block 310), the network device may forward the content out an interface through which an interest packet for the content was received, may determine that an interest packet for the requested content has been satisfied, and may remove the entry from the PIT at block 320.

At block 325, the network device may cache the content in a CS of the network device. The network device may add the removed entry for the content to the PIRT at block 330. The network device may advertise to neighboring network devices that the content is cached on the network device at block 335.

At block 340, the network device may forward the requested content back to the original requester, such as over the interface through which the interest packet was received.

Modifications, additions, or omissions may be made to the method 300 without departing from the scope of the present disclosure. For example, the operations of the method 300 may be implemented in differing order. Additionally or alternatively, two or more operations may be performed at the same time. Further, the outlined operations and actions are only provided as examples, and some of the operations and actions may be optional, combined into fewer operations and actions, or expanded into additional operations and actions without detracting from the essence of the disclosed embodiments.

Figure 4:
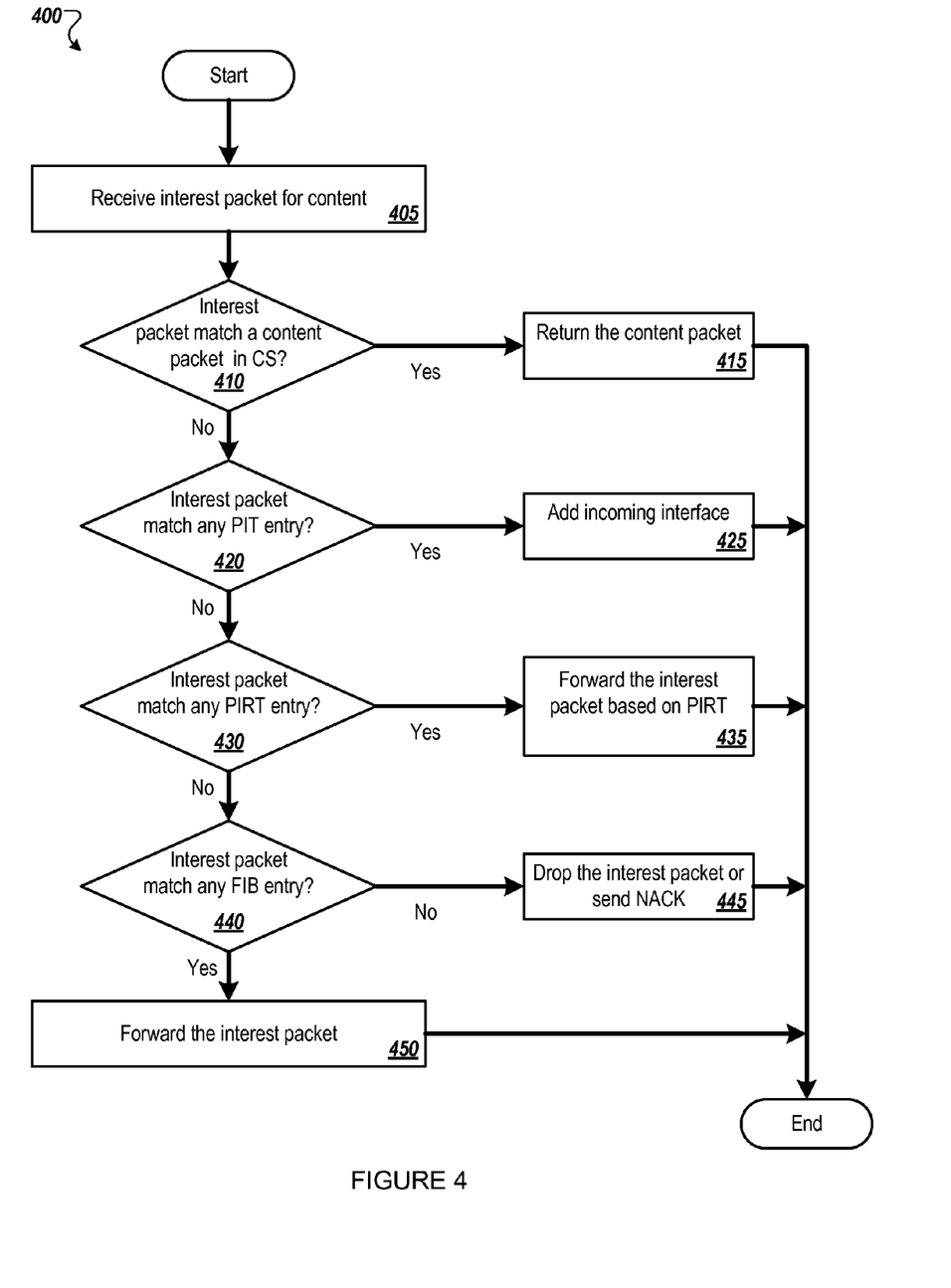
FIG. 4 is a flowchart of an example method of interest packet handling in an ICN network.

FIG. 4 is a flowchart of an example method 400 of interest packet handling in an ICN network, according to at least one embodiment of the present disclosure. The method 400 may be performed by any suitable system, apparatus, or device. For example, the network 100 of FIG. 1, the network device 200 of FIG. 2, or a computer system 500 of FIG. 5 may perform one or more of the operations associated with the method 400. In these and other embodiments, program instructions stored on a computer readable medium may be executed to perform one or more of the operations of the method 400. For convenience in the discussion that follows, the method 400 is discussed as being performed by a network device.

At block 405, the network device may receive an interest packet at an incoming interface (for example, from the end user device or another network device).

At block 410, the network device may check if the interest packet is requesting content already stored in a CS of the network device. If the content is in the content store of the network device (e.g., "YES" at block 410), the network device may send the content in a content packet back over the interface through which the interest packet was received at block 415.

If the content is not in the content store of the network device (e.g., "NO" at block 410), the network device may check the PIT of the network device at block 420 to determine if there is an entry for the interest packet. If there is an entry in the PIT for the interest packet (e.g., "YES" at block 420), the network device may update the entry for the interest packet at block 425 to also include the interface over which the interest packet was received. If there is no entry for the interest packet in the PIT (e.g., "NO" at block 420), the network device may check the PIRT of the network device at block 430 to determine if there is an entry for the interest packet in the PIRT.

If there is an entry in the PIRT for the interest packet (e.g., "YES" at block 430), the network device may forward the interest packet at block 435 according to instructions for that interest packet in the PIRT. If there is not a matching entry in the PIRT (e.g., "NO" at block 430), at block 440 the network device may check the FIB for a matching entry.

If there is not a matching entry in the FIB (e.g., "NO" at block 440), the network device 121 may drop the interest packet or send a negative acknowledgment message ("NACK") toward the requestor through the interface by which the interest packet came. If the FIB includes a matching entry (e.g., "YES" at block 440), the network device may forward the interest packet based on the FIB.

Modifications, additions, or omissions may be made to the method 400 without departing from the scope of the present disclosure. For example, the operations of the method 400 may be implemented in differing order. Additionally or alternatively, two or more operations may be performed at the same time. Further, the outlined operations and actions are only provided as examples, and some of the operations and actions may be optional, combined into fewer operations and actions, or expanded into additional operations and actions without detracting from the essence of the disclosed embodiments.

Figure 5:
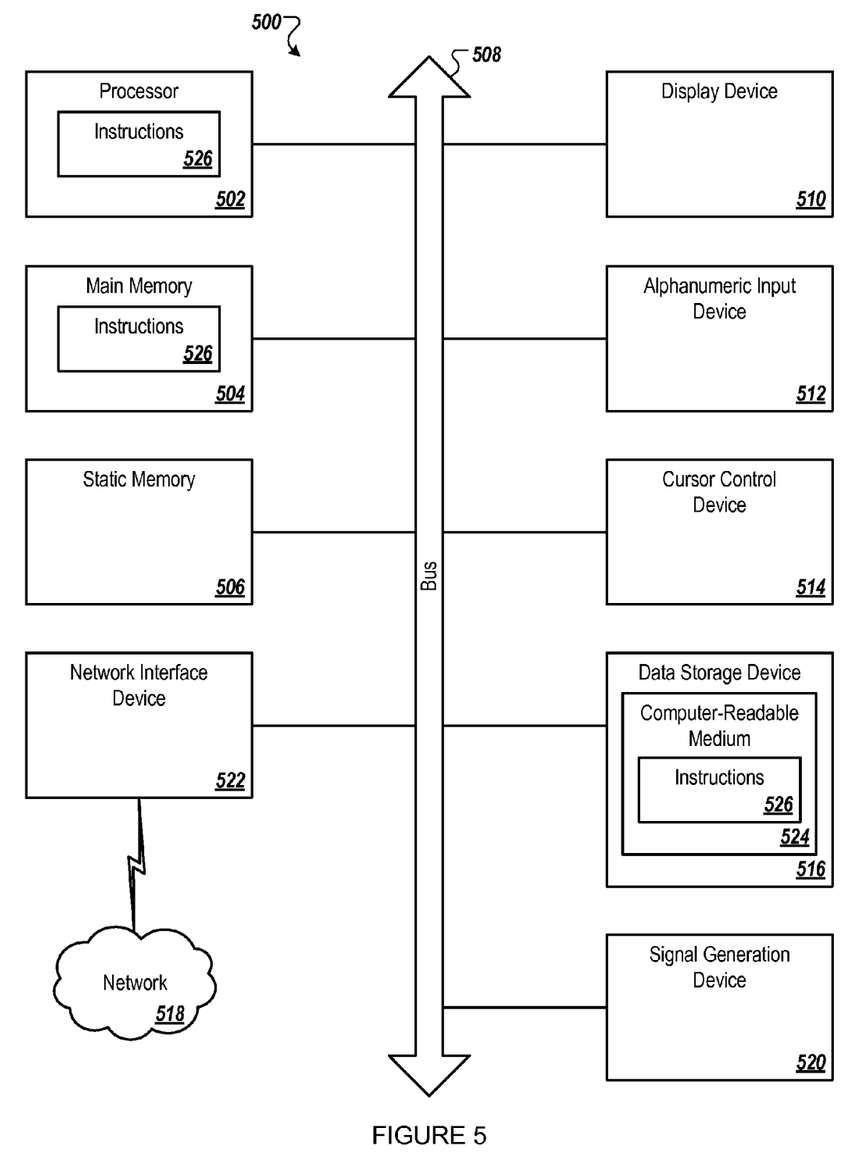
FIG. 5 illustrates an example computer system operating in an ICN network, all according to at least one embodiment of the present disclosure.

FIG. 5 illustrates a block diagram of an example computer system 500 operating in an ICN network, according to at least one embodiment of the present disclosure. Any one of the network devices 121, 122, 123, 124, 125 or 126, the content server 130, and/or the end user device 110 may be implemented as a computing system such as the example computer system 500. The computer system 500 may be configured to implement one or more operations of the present disclosure.

The computer system 500 executes one or more sets of instructions 526 that cause the computer system 500 to perform any one or more of the methodologies discussed herein. The computer system 500 may operate in the capacity of a server or a client machine in client-server network environment, or as a peer machine in a peer-to-peer (or distributed) network environment. The computer system 500 may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 526 to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions for performing the operations and steps discussed herein.

The computer system 500 may further include a network interface device 522 that provides communication with other machines over a network 518, such as a local area network (LAN), an intranet, an extranet, or the Internet. The network interface device 522 may include any number of physical or logical interfaces. The network interface device 522 may include any device, system, component, or collection of components configured to allow or facilitate communication between network components in an ICN network. For example, the network interface device 522 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The network interface device 522 may permit data to be exchanged with a network (such as a cellular network, a WiFi network, a MAN, an optical network, etc., to name a few examples) and/or any other devices described in the present disclosure, including remote devices. In some embodiments, the network interface device 522 may be logical distinctions on a single physical component, for example, multiple communication streams across a single physical cable or optical signal.

The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored the sets of instructions 526 embodying any one or more of the methodologies or functions described herein. The sets of instructions 526 may also reside, completely or at least partially, within the main memory 504 and/or within the processor 502 during execution thereof by the computer system 500, the main memory 504 and the processor 502 also constituting computer-readable storage media. The sets of instructions 526 may further be transmitted or received over the network 518 via the network interface device 522.

While the example of the computer-readable storage medium 524 is shown as a single medium, the term "computer-readable storage medium" may include a single medium or multiple media (e.g., a centralized or distributed database, and/or associated caches and servers) that store the sets of instructions 526. The term "computer-readable storage medium" may include any medium that is capable of storing, encoding or carrying a set of instructions for execution by the machine and that cause the machine to perform any one or more of the methodologies of the present disclosure. The term "computer-readable storage medium" may include, but not be limited to, solid-state memories, optical media, and magnetic media.

Modifications, additions, or omissions may be made to the computer system 500 without departing from the scope of the present disclosure. For example, in some embodiments, the network device 200 may include any number of other components that may not be explicitly illustrated or described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   receiving a content packet at an interface of a network device;
   determining whether the content packet matches an identifier of the content packet in an entry in a pending interest table (PIT);
   discarding the content packet when the content packet does not match the identifier of the content packet in the entry in the PIT;
   removing a matching entry from the PIT when the content packet matches the identifier of the content packet in the matching entry in the PIT;
   caching the content packet in a content store (CS);
   adding the matching entry to a pending interest removal table (PIRT);
   sending a message to one or more network devices that indicates that the content packet is cached on the network device;
   receiving an interest packet at the network device;
   responsive to a determination that the interest packet does not match content stored in the CS, determining whether the interest packet matches an entry in the PIT; and
   adding an identifier of the interface to the PIT when the interest packet does not match an entry in the PIT.

2. The method of claim 1 further comprising sending the content packet to a network node in response to receiving the interest packet for content in the content packet.

3. The method of claim 1 further comprising:
   determining that the interest packet matches content stored in the CS; and
   returning the content from the CS of the network device.

4. The method of claim 1 further comprising:
responsive to the determination that the interest packet does not match data stored in the CS and in the PIT, determining whether the interest packet matches an entry in the PIRT;
when the interest packet matches an entry in the PIRT, forwarding the interest packet to a neighboring network device based on the entry in the PIRT; and
when the interest packet does not match an entry in the PIRT, determining whether a forwarding information base (FIB) includes an entry that matches the interest packet.

5. The method of claim 4 further comprising:
forwarding the interest packet to a node when the FIB includes the entry that matches the interest packet; and
dropping the interest packet or sending a negative acknowledgement via an incoming interface of the network device when the FIB does not include the entry that matches the interest packet.

6. The method of claim 1 further comprising removing the entry from the PIRT after a timeout period expires.

7. A non-transitory computer-readable medium containing instructions that, when executed by a processor, are configured to cause the processor to perform operations, the operations comprising:
receiving a content packet at an incoming interface of a network device;
determining whether the content packet matches an identifier of the content packet in an entry in a pending interest table (PIT);
discarding the content packet when the content packet does not match the identifier of the content packet in the entry in the PIT;
removing a matching entry from the PIT when the content packet matches the identifier of the content packet in the matching entry in the PIT;
caching the content packet in a content store (CS);
adding the matching entry to a pending interest removal table (PIRT); and
sending a message to one or more network devices that indicates that the content packet is cached on the network device;
receiving an interest packet at the network device;
responsive to a determination that the interest packet does not match content stored in the CS, determining whether the interest packet matches an entry in the PIT; and
adding an identifier of the interface to the PIT when the interest packet does not match an entry in the PIT.

8. The computer-readable medium of claim 7, the operations further comprising sending the content packet to a network node in response to receiving the interest packet for content in the content packet.

9. The computer-readable medium of claim 7, the operations further comprising:
determining that the interest packet matches content stored in the CS; and
returning the content from the CS of the network device.

10. The computer-readable medium of claim 7, the operations further comprising:
responsive to the determination that the interest packet does not match data stored in the CS and in the PIT, determining whether the interest packet matches an entry in the PIRT;
when the interest packet matches an entry in the PIRT, forwarding the interest packet to a network device based on the entry in the PIRT; and
when the interest packet does not match an entry in the PIRT, determining whether a forwarding information base (FIB) includes an entry that matches the interest packet.

11. The computer-readable medium of claim 10, the operations further comprising:
forwarding the interest packet to a node when the FIB includes the entry that matches the interest packet; and
dropping the interest packet or sending a negative acknowledgement via the incoming interface of the network device when the FIB does not include the entry that matches the interest packet.

12. A network device comprising:
a memory, and
a processor operatively coupled to the memory, the processor being configured to:
receive a content packet at an incoming interface of a network device;
determine whether the content packet matches an identifier of the content packet in an entry in a pending interest table (PIT);
discard the content packet when the content packet does not match the identifier of the content packet in the entry in the PIT;
remove a matching entry from the PIT when the content packet matches the identifier of the content packet in the matching entry in the PIT;
cache the content packet in a content store (CS);
add the matching entry to a pending interest removal table (PIRT); and
send a message to one or more network devices that indicates that the content packet is cached on the network device;
receive an interest packet at the network device;
responsive to a determination that the interest packet does not match content stored in the CS, determine whether the interest packet matches an entry in the PIT; and
add the incoming interface to the PIT when the interest packet does not match an entry in the PIT.

13. The network device of claim 12, the processor being further configured to send the content packet to a network node in response to receiving the interest packet for content in the content packet.

14. The network device of claim 12, the processor being further configured to:
determining that the interest packet matches content stored in the CS; and
returning the content from the CS of the network device.

15. The network device of claim 12, the processor being further configured to:
responsive to the determination that the interest packet does not match data stored in the CS and in the PIT, determine whether the interest packet matches an entry in the PIRT;
when the interest packet matches an entry in the PIRT, forward the interest packet to a neighboring network device based on the entry in the PIRT; and
when the interest packet does not match an entry in the PIRT, determine whether a forwarding information base (FIB) includes an entry that matches the interest packet.

16. The network device of claim 15, the processor being further configured to:
forward the interest packet to a node when the FIB includes an entry that matches the interest packet; and drop the interest packet or sending a negative acknowledgement via the incoming interface of the network device when the FIB does not include the entry that matches the interest packet.

17. The network device of claim 16, the processor being further configured to remove the entry from the PIRT after a timeout period expires.

* * * * *